(No Model.)

2 Sheets—Sheet 1.

C. A. JOHANSSON.
STEP BEARING FOR SHAFTS.

No. 405,559.

Patented June 18, 1889.

Fig: 1

Witnesses:
John H. Rennie

Inventor
Carl A. Johansson.
By
Henry Connett
Attorney.

(No Model.) 2 Sheets—Sheet 2.

C. A. JOHANSSON.
STEP BEARING FOR SHAFTS.

No. 405,559. Patented June 18, 1889.

WITNESSES:
John A. Rennie
J. D. Chaplin

INVENTOR:
Carl A. Johansson
By Henry Connett
Attorney.

UNITED STATES PATENT OFFICE.

CARL AUGUST JOHANSSON, OF STOCKHOLM, SWEDEN, ASSIGNOR TO THE AKTIEBOLAGET EXTRAKTOR, OF SAME PLACE.

STEP-BEARING FOR SHAFTS.

SPECIFICATION forming part of Letters Patent No. 405,559, dated June 18, 1889.

Application filed February 21, 1889. Serial No. 300,664. (No model.) Patented in Sweden August 7, 1888, No. 1,644.

*To all whom it may concern:*

Be it known that I, CARL AUGUST JOHANSSON, a subject of the King of Sweden, and a resident of Stockholm, Sweden, have invented certain Improvements in Step-Bearings for Shafts, (for which I have obtained Patent No. 1,644, August 7, 1888, in Sweden,) of which the following is a specification.

My invention relates to that class of steps or step-bearings for shafts wherein the end of the shaft bears on a sphere or ball.

The object of my invention is to so arrange the ball upon which the end of the shaft bears that it will provide a rolling contact and constantly shift its position, and thus wear evenly.

Figure 1:
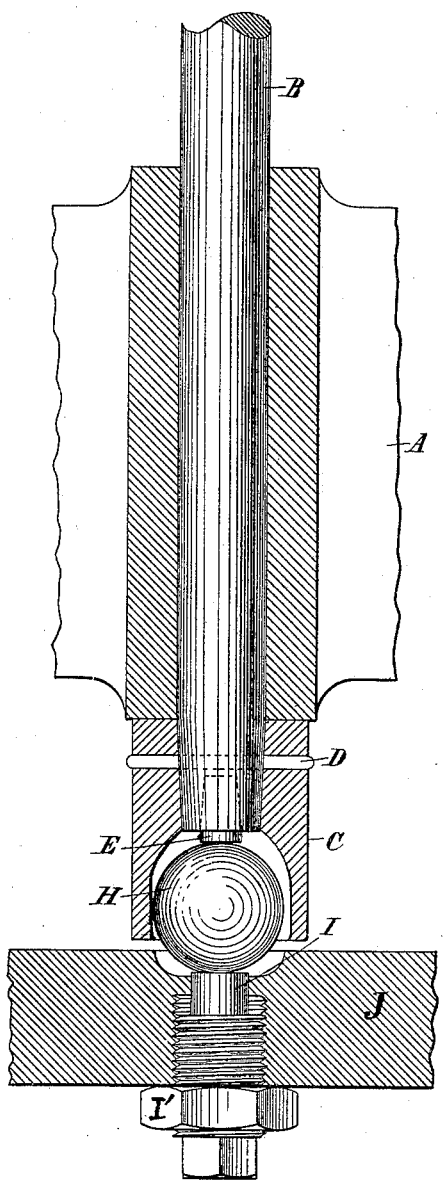
Figure 2:
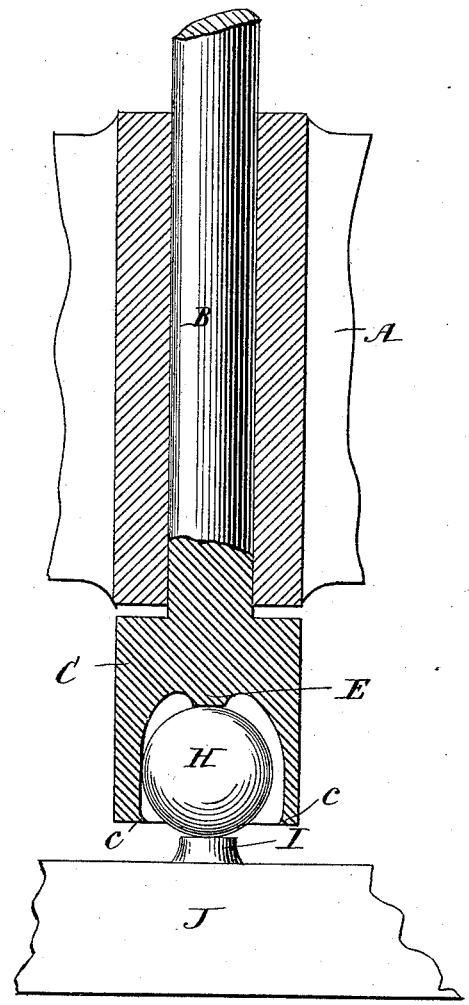

In the drawings, which serve to illustrate my invention, Figure 1 is a sectional elevation showing a vertical shaft provided with my improved step-bearing. Fig. 2 is a similar view illustrating a slightly different construction of the parts.

Referring to Fig. 1, A represents any ordinary fixed bearing, in which revolves the shaft B. On the lower end of said shaft B is secured, by a key D, as here represented, a cup C. In a socket in the end of the shaft B is set a plug or stud E, which projects a little way into the hollow of the cup C. H is the ball or sphere which is inclosed within the cup C, and rests on the end of a screw-threaded bearing-stud I, which is screwed up through any suitable form of base J. The stud I is provided with a lock-nut I', to secure it in position when adjusted. The diameter of the cavity of the cup C is a little greater than that of the ball H, and its depth should be, as here shown, somewhat less than the diameter of the ball, so that the latter may project beyond or below the margin of the cup. The axes of the stud I, plug E, and shaft B, are aligned; but the ball stands a little out of line with the shaft, as seen in the drawings—that is to say, if the axis of the shaft were prolonged it would not pass through the center of the ball. The lateral displacement of the ball is, however, limited by the wall of the cup C, which the ball touches at one side, as seen in the drawings. If the cup C were removed, it is obvious that the rotation of the shaft would gradually increase the displacement of the ball and finally expel it laterally; but the ball is in contact with the wall of the cup at one side, and is thus driven or rotated by the cup as the latter revolves with the shaft. Thus the point or surface of contact of the ball under the plug E, which is not at the pole or axis terminal of the sphere, will be constantly shifting, and the constant vibration of the machine will also jar the ball in such an irregular manner as to cause the latter to perpetually shift its position and present new points to receive the wear. Thus the ball will always provide a rolling contact, and the wear will be approximately uniform on its surface.

The margin of the cup C may be provided with an inturned flange c, in order to enable the cup to retain a little liquid lubricant, as oil or water, to lubricate the inner wall of the cup and the surface of the ball.

It is not essential that the cup C and plug E shall be constructed as seen in Fig. 1. They may both, or either of them, be integral with the shaft B. The ball H may also rest on a bearing formed integrally with the base J. This integral construction is illustrated in Fig. 2.

My step-bearing is well adapted for shafts to be driven at high speed, and while particularly well adapted for vertically-arranged shafts, it is also well adapted for horizontal or oblique shafts subjected to endwise or longitudinal pressure.

Having thus described my invention, I claim—

1. The combination of a shaft having a cup fixed on its end and rotating therewith, the mouth of said cup being directed away from the shaft, a bearing-stud aligned with said shaft, and a ball or sphere within said cup and embraced between the end of some part of the shaft within the cup and the said bearing-stud, the diameter of the cavity of the cup being a little greater than that of the ball, which latter is in contact peripherally with the wall of said cup at one side, whereby, when the shaft revolves, said ball is rotated through its lateral contact with the cup, as set forth.

2. The combination, with the shaft B, provided with the projecting plug E, and the cup C, fixed on the end of said shaft and revolving therewith and provided with an oil-retaining flange, of the adjustable bearing-stud I in line with the shaft and the ball or sphere H within said cup and embraced between the plug E and stud I, the diameter of the cup being greater than that of the ball, which latter is in contact peripherally with the wall of said cup at one side, whereby said cup drives said ball, as set forth.

In witness whereof I have hereunto signed my name in the presence of two subscribing witnesses.

CARL AUGUST JOHANSSON.

Witnesses:
NERE A. ELFWING,
ERNST SVANGVIST.